United States Patent
Burness et al.

[15] 3,681,372
[45] Aug. 1, 1972

[54] BIS-ISOXAZOLE COMPOUNDS AND THEIR QUATERNARY SALTS

[72] Inventors: Donald M. Burness; Jerome J. Looker, both of Rochester, N.Y.

[73] Assignee: Eastman Kodak Company, Rochester, N.Y.

[22] Filed: July 10, 1968

[21] Appl. No.: 750,707

Related U.S. Application Data

[60] Division of Ser. No. 647,324, June 20, 1967, abandoned, Continuation-in-part of Ser. No. 486,189, Sept. 9, 1965, abandoned.

[52] U.S. Cl............260/307 H, 96/111, 260/86.1 N, 260/88.3 R, 260/117, 260/567.6 P, 260/570.5 P

[51] Int. Cl. ............................................C07d 85/22
[58] Field of Search....................................260/307.8

[56] References Cited

OTHER PUBLICATIONS

Ricca, Gazz. Chim. Ital., Vol. 91, pages 83– 89 (1961).

*Primary Examiner*—Alton D. Rollins
*Attorney*—William H. J. Kline and Bernard D. Wiese

[57] ABSTRACT

Bis-isoxazoles and their quaternary salts are disclosed. The quaternary salts are particularly useful in rendering carboxyl-containing polymers and other compositions resistant to the swelling from aqueous solutions.

4 Claims, No Drawings

BIS-ISOXAZOLE COMPOUNDS AND THEIR QUATERNARY SALTS

This application is a division of application Ser. No. 647,324 filed June 20, 1967, and now abandoned, which is a continuation-in-part of our copending application Ser. No. 486,189 filed Sept. 9, 1965, abandoned June 11, 1968.

BACKGROUND OF THE INVENTION

1. Field of Invention

This invention relates to a new class of nitrogen-containing compounds, their ammonium salts, and uses of such materials. In one aspect, this invention relates to the rendering of hydrophilic colloid compositions, capable of forming layers, resistant to the effects of swelling from aqueous solutions.

In another of its aspects, this invention relates to photographic elements comprising a layer hardened by bis-isoxazolium salts and having reduced staining properties.

2. Description of the Prior Art

The use of gelatin and certain synthetic carboxyl-containing polymers, alone and in combination with each other as vehicles in solutions, emulsions, and layers, as for example in photographic products, is enhanced by increasing their resistance to swelling from aqueous solutions.

Various materials have been suggested for increasing swell resistance of such hydrophilic materials and although some have shown utility, many of these have adversely affected the properties, particularly photographic properties, of materials containing them. In order to improve resistance to swell or hardening of a hardenable material such as a carboxyl-containing polymer, without adversely affecting photographic materials, hardening agents, such as aziridines, have been incorporated into the hardenable materials. However, because of their detrimental physiological effect, aziridines have not proved wholly satisfactory.

It is evident therefore, that the art would be advanced by an effective, safe, and convenient means for providing good swell resistance to hardenable materials, particularly carboxyl-containing materials, using compounds which are readily soluble and which neither adversely affect the photographic properties of such materials nor adversely affect the individual workers.

SUMMARY OF INVENTION

We have now discovered a new class of bis heterocyclic compounds, as described herein. These compounds comprise two isoxazole rings which are linked to one another through carbon atoms at ring positions 2, 4, or 5 of said isoxazole rings where O and N are 1-2 with respect to each other. In addition, each isoxazole ring is unsubstituted in the 3 position. Compounds of this type effectively increase swell resistance from aqueous solutions of systems comprising a hardenable material, e.g. a carboxyl-containing polymer, without any significant detrimental side effects.

In practicing this invention, these compounds are conveniently used in the form of their ammonium salts which are water-soluble and can be easily incorporated into aqueous compositions comprising carboxyl-containing polymers such as gelatin or synthetic polymers.

Such salts can be effectively used in any concentration for hardening purposes, although suitable hardening concentrations are generally in the range of about 1 to about 5 percent, by weight, based on the weight of hardenable material such as carboxyl-containing polymer.

As illustrated by example 11, the hardeners described herein are particularly effective in color photography since their use results in reducing the stain usually exhibited by multiple layer photographic silver halide systems which contain a color coupler and hydrophilic colloid layers. Such layers generally comprise hardenable carboxyl-containing polymers such as gelatin, vinyl polymers, or mixtures thereof. Suitable carboxyl-containing polymers are film-forming and suitable vinyl polymers are exemplified by ethyl-acrylate-acrylic acid polymer (4:1 by weight), butyl acrylate-acrylic acid polymer (9:1 by weight), and the like. The various following examples are illustrative in contrasting the photographic effects of prior art hardening agents in comparison to those agents of the present invention.

DESCRIPTION OF PREFERRED EMBODIMENTS

One embodiment of this invention relates to bis heterocyclic compounds comprising two isoxazole rings linked through carbon atoms at ring positions 2, 4, and 5 of said isoxazole rings, each of said rings being unsubstituted in the 3 position.

Another embodiment of this invention relates to a bis isoxazole or its quaternary salt comprising two isoxazole rings unsubstituted in their 3 positions and linked at their 2, 4, or 5 positions through a divalent aliphatic or aromatic group.

Another embodiment of this invention relates to bis-isoxazolium salts having the following formulas:

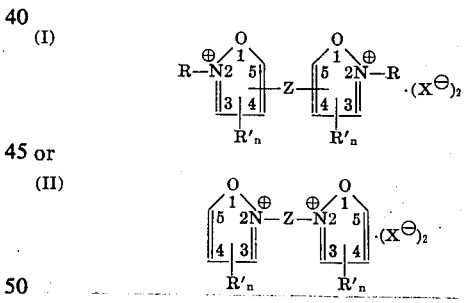

where each Z is a divalent aliphatic or aromatic radical, each R is aliphatic hydrocarbon of 1–4 carbons, each R' is alkyl, cycloalkyl, or aryl, provided R' is not linked to a ring in the 3 position, each $n$ is an integer of from 0 to 2 and each X is an anion.

Another embodiment relates to a photographic element comprising a support, and a layer comprised of a carboxyl-containing polymer hardened with a bis isoxazolium salt.

Still another embodiment relates to a composition comprising a hydrophilic colloid containing a bis isoxazolium salt in hardening concentration.

The bis heterocyclic compounds of this invention comprise at least two heterocyclic rings. The hetero atoms in each of these rings are nitrogen and oxygen in the 1–2 position with respect to each other.

As already indicated, the two isoxazole rings present in the heterocyclic compounds of this invention are linked through carbon atoms at their 2, 4, or 5 positions. Suitable linking groups (designated Z in the formulas) are divalent aliphatic or aromatic groups. Suitable aliphatic groups, including cycloaliphatic groups, can be straight chain or branched and include alkylene, cycloalkylene, and the like. Generally, a linking group contains not more than 10 carbon atoms and includes alkylene groups such as tetramethylene, pentamethylene, hexamethylene, and arylene groups, such as phenylene, and the like. Linking groups are preferably hydrocarbon but such groups can also contain atoms other than carbon, for example, oxygen, sulfur, nitrogen, and the like. The nitrogen atoms in the two isoxazole rings present in the compounds of this invention carry aliphatic substituents, designated as R in the above formulas. Suitable R substituents contain one to four carbon atoms and include for example, methyl, ethyl, propyl, butyl, allyl, tertiary butyl, isopropyl, and the like. Each isoxazole ring can carry substituents, designated R' in the above formulas. Such substituents occur at the various available isoxazole ring positions other than 3 and include alkyl, cycloalkyl, and aryl groups as exemplified by methyl, ethyl, hexyl, cyclopentyl, cyclohexyl, phenyl, naphthyl, and the like. Such groups can be hydrocarbon or can contain atoms other than carbon and hydrogen, e.g. oxygen or halogen as in hydroxyalkyl or chloroalkyl groups. The anion previously shown as X, can be, for example, perchlorate, p-toluenesulfonate, chloride, nitrate, tetrafluoroborate, or the like. It is most desirable that the anion contributes to the water solubility of the base compound and that the entire radical possesses a negative valence of two.

A convenient method for preparing the bis isoxazole compounds of this invention comprises reacting an appropriate hydroxylamine salt, such as hydroxylamine hydrochloride, and a suitable substance comprising two β-ketoaldehyde moieties, such as p-phenylenebis(diethylamino-propenone), 2,2'-p-phenylenebis-(3-dimethylaminoarolin) and the like, or its equivalent precursor substance in situ. The novel salts of these compounds are prepared by reacting these bis isoxazole compounds with compounds capable of producing the desired anion in a suitable solvent. All such reactions are carried out in the presence of organic solvents at moderate temperatures. In general, the reaction forming the bis isoxazole compounds is complete in 20 hours or less but may take as long as 72 hours and the resulting compounds are isolated by conventional procedures. The reactions are not pressure dependent and therefore superatmospheric or subatmospheric pressures are employed. As is obvious to one skilled in the art, the specific reaction conditions, for example, temperature, pressure, and the like, depend upon the particular reactants employed.

The compounds described in this application can be used effectively in combination with hardenable materials in general but are most advantageously used with hydrophilic colloid coating compositions used in preparing photographic elements added either in solution or as addition salts. Specific materials which can be hardened according to the practice of this invention include hardenable carboxyl-containing polymers such as gelatin, binding materials such as colloidal albumin, water-soluble vinyl polymers, cellulose derivatives, proteins, water-soluble polyacrylamides, dispersed polymerized vinyl compounds, particularly those which increase the dimensional stability of photographic materials as exemplified by polymers of alkyl acrylates, methacrylates, acrylic acid, sulfoalkyl acrylates, methacrylates, maleic-acid and the like.

The hardening agents described herein can be used in various kinds of photographic emulsions. In addition to being useful in orthochromatic, panchromatic and infrared emulsions, they are also useful in x-ray and other nonoptically sensitized emulsions. They can be added to the emulsions before or after any optically sensitizing dyes which may be used. They are effective in sulfur and gold sensitized silver halide emulsions. Various silver salts can be used as sensitive salts, including, for example, silver bromide, silver iodide, silver chloride, silver chlorobromide, silver bromoiodide, or silver chloroiodide.

The materials hardened in the practice of this invention can be coated on a wide variety of supports. Typical supports include those generally employed for photographic elements, as exemplified by cellulose nitrate film, cellulose acetate film, polyvinyl acetal film, polystyrene film, polyethylene terephthalate film, and related films of resinous materials as well as glass, paper, metal, wood, and the like. Supports such as paper that are coated with α-olefin polymers, particularly polymers of α-olefins containing two to ten carbon atoms, as for example, polyethylene, polypropylene, ethylene butene copolymers, and the like, can also be employed.

In addition to the hardening agents disclosed herein, photographic emulsions and elements can also contain additional additives, particularly those known to be beneficial in photographic emulsions as exemplified by optical sensitizers, speed increasing materials, other hardeners, plasticizers, and the like.

This invention can be further illustrated by the following examples of preferred embodiments thereof although it will be understood that these examples are included merely for purposes of illustration and are not intended to limit the scope of the invention unless otherwise specifically indicated.

Example 1—5,5'-(p-Phenylene)bisisoxazole 3.2 Parts of p-diacetylbenzene and 15 parts of ethyl formate by weight are dissolved in 80 parts of benzene. This solution is then added to a suspension of 6.5 parts of sodium methoxide in 50 parts of benzene at 10°C. The mixture is allowed to warm to 25°C. and is left standing for 16 hours. The benzene is then distilled off, and the residue dissolved in methanol, and a solution of 9.8 parts of dimethylamine hydrochloride in methanol is added. After 5 hours, the solvent is distilled off; and the solid residue washed with benzene and then with water giving 4.2 parts of 1,1'-(p-phenylene)bis-(3-dimethylamino-2-propen-1-one) having a melting point of 260°–262°C.

To a suspension of 22 parts of the p-phenylenebis-(dimethylamino-propenone) (the preparation of which is described in the preceding paragraph) in 150 parts of water is added a solution of 12 parts of hydroxylamine hydrochloride in 100 parts of water. The mixture is heated on a steam bath for 90 minutes; the solid is collected, washed with water, dried and recrystallized from ethanoldchloroform. There is obtained 9.8 parts of 5,5'-(p-phenylene)bis isoxazole which has a melting point of 215°–216°C.

Example 2—5,5'-(p-Phenylene)bis(N-ethylisoxazolium perchlorate)

25 Parts of triethyloxonium tetrafluoroborate are dissolved in methylene chloride and to the stirred solution is added a solution of 5 parts of 5,5'-(p-phenylene)bis isoxazole (the product of example 1) in methylene chloride. The mass is allowed to react 20 hours forming 9.8 parts of a product having a melting point of 241°–242°C. This product is converted to the perchlorate with sodium perchlorate forming six parts of 5,5'-(p-phenylene)bis(N-ethylisoxazolium perchlorate). The product is recrystallized using as the solvent a mixture of acetonitrile and ethanol. The purified material has a melting point of 227°C. at which temperature decomposition occurs.

Example 3—5,5'-(p-Phenylene)bis-N-methylisoxazolium methosulfate

A mixture of 2.1 parts of 5,5'-(p-phenylene)bis isoxazole and 50 parts of dimethyl sulfate is heated for one hour on a steam bath. A solid material separate which is washed with ether giving 2.3 parts of 5,5'-(p-phenylene)bis-(N-methylisoxazolium methosulfate), m.p. 184°–185°C.

Example 4—5,5'-Tetramethylenebis(2-ethylisoxazolium fluoroborate)

5,5'-Tetramethylenebis(isoxazole) is prepared by known methods, as for example in a process described by A. E. Pohland and W. R. Benson, Chemical Reviews, Vol. 66, p. 161, 1966, starting with adipyl chloride.

A solution of 4 parts of 5,5'-tetramethylenebis-(isoxazole) in 50 parts of anhydrous acetonitrile is treated with 8 parts of triethyloxonium fluoroborate. The solution becomes warm and an oil separates, which crystallizes on swirling. After 30 minutes, the solid, 5,5'-tetramethylenebis(2-ethyl-isoxazolium fluoroborate), is collected (8 parts) and recrystallized from ethanol-acetonitrile to give 5 parts (56 percent) of product, with a melting point of 122°–123°C.

Example 5—2,5-Dimethylhexane-2,5-diyl-2', 2''-bis(5-methylisoxazolium fluoroborate)

A mixture of 2.9 parts of 2,5-dimethylhexane-2,5-diol, 3,3 parts of 5-methylisoxazole, and 7.2 parts of 48 percent fluoroboric acid is allowed to stand for 3 days and the solvent is removed. The residue is dissolved in acetone (20 parts) and ether is added. The oil that separates crystallizes on washing with ether and the solid recrystallizes from acetone, 1.65 parts (18 percent), with a melting point of 130°–132°C. A form melting at 126°–127°C. and having the correct elemental analysis is also obtained.

Example 6—4,4'-p-Phenylenebis(N-ethylisoxazolium fluoroborate)

2,2'-p-Phenylenebis(1-dimethylamino-1-propen-3-ylidene-N,N-dimethylimmonium perchlorate) is prepared from p-phenylene-diacetic acid using the procedure of Z. Arnold, Coll. Czech. Chem. Comm. 26, 3,051 (1961). A mixture of 67 parts of the perchlorate, 500 parts of chloroform and a solution of 69 parts of potassium carbonate in 600 parts of water is stirred vigorously at reflux for 46 hours and filtered. The chloroform layer is evaporated and the residue slurried first with ethanol and then ether giving 13.6 parts of crude 2,2'-p-phenylenebis(3-dimethylaminoacrolein). The unreacted solid from the filtration is treated further with aqueous carbonate to give an additional 12.5 parts of product. Recrystallization from acetonitrile yields 22.5 parts of the pure dialdehyde; m.p. 211°–213°C. A mixture of 5.4 parts of 2,2'-p-phenylenebis(3-dimethylaminoacrolein), 3.1 parts of hydroxylamine hydrochloride, 0.25 parts of concentrated hydrochloric acid, and 30 parts of acetic acid is heated at reflux for 3 hours and concentrated. The residue is washed with water and recrystallized from 20 parts of acetonitrile to give 2.4 parts (57 percent) of 4,4'-p-phenylenebis(isoxazole). The melting point is 195°–196°C. The tan color is removed with charcoal.

A hot solution of 2.1 parts of 4,4'-p-phenylenebis-(isoxazole) in 50 parts of 1,2-dichloroethane is added in one portion to a solution of 10 parts of triethyloxonium fluoroborate in 20 parts of the same solvent. After cooling to room temperature, the solid, 4,4'-p-phenylenebis(N-ethylisoxolium fluoroborate), is collected, 4.4 parts (100 percent), m.p. 241°C., decompose. Recrystallization from acetonitrile gives material melting at 244°C. decompose.

EXAMPLE 7

As previously indicated, the compounds described herein give very good results when used as hardening agents in photographic applications. To illustrate, the compounds prepared in examples 2 and 3 are added in various concentrations to separate portions of a high-speed gelatino silver bromoiodide photographic emulsion. Each emulsion sample is coated onto a cellulose acetate film support at a coverage of 459 mg. of silver and 1,040 mg. of gelatin per square foot. Each film coating is exposed on an Eastman 1B sensitometer, processed for five minutes in Kodak Developer DK-50, fixed, washed, and dried. The resistance to swell, relative speed, contrast, and fog are determined and are as follows:

TABLE 1

| % by wt. com- pound gela- tin | based on | fresh test rel. speed | gamma | fog | 1 wk. incubation 120°F. 50% relative humidity rel. speed | gamma | fog | % swell DK–50 fix | wash |
|---|---|---|---|---|---|---|---|---|---|
| None | – | 100 | 1.39 | .13 | 59 | .94 | .45 | 1200 520 | 880 |
| Ex. 2 | 1 | 91 | 1.23 | .14 | 60 | .95 | .38 | 1300 570 | 960 |
| Ex. 2 | 3 | 85 | 1.22 | .11 | 73 | .97 | .18 | 990 460 | 760 |
| Ex. 2 | 6 | 53 | 1.07 | .08 | 58 | .87 | .09 | 770 370 | 590 (in water) |
| None | – | 100 | 1.23 | .15 | 76 | 1.12 | .27 | 760 | |
| Ex. 3 | 1 | 94 | 1.27 | .10 | 80 | 1.12 | .14 | 660 | |
| Ex. 3 | 3 | 74 | 1.15 | .08 | 71 | 1.08 | .09 | 550 | |

EXAMPLE 8

The procedure of example 7 is repeated using the compounds prepared in examples 4–6. The results obtained are as follows:

TABLE 2

1 wk. incubation    2 wk. incubation

| | % by wt. com- pound based on gela- tin | fresh test rel. speed | | | 120°F. 50% relative humidity rel. speed | | | 120°F. 50% relative humidity rel. speed | | |
|---|---|---|---|---|---|---|---|---|---|---|
| | | | gamma | fog | | gamma | fog | | gamma | fog |
| None | — | 100 | 1.23 | .16 | 76 | 1.02 | 0.43 | 45 | .68 | .86 |
| Ex. 4 | 3 | 73 | 1.08 | .11 | 67 | .87 | 0.12 | 55 | .77 | .27 |
| None | — | 100 | 1.42 | .20 | 83 | 1.21 | 0.38 | 27 | .73 | 1.13 |
| Ex. 5 | 1 | 94 | 1.35 | .18 | 63 | 1.05 | 0.23 | 35 | .83 | .63 |
| None | — | 100 | 1.48 | .16 | 94 | 1.39 | 0.21 | 60 | 1.21 | .36 |
| Ex. 6 | 1 | 71 | 1.23 | .11 | 55 | 1.00 | 0.15 | 47 | 1.33 | .18 |

EXAMPLE 9

The hardeners described herein can be employed in photographic emulsions using a mixed vehicle rather than gelatin above as in example 7. To illustrate, a mixed vehicle composed of 3 parts of polymer and 1 part of gelatin by weight is used in the procedure of example 7. This vehicle is coated at 750 mg/ft$^2$. The polymer used is a copolymer composed of 80 percent by weight ethyl acrylate and 20 percent by weight acrylic acid. For comparison, resorcinol diglycidyl ether, a known hardener, is employed in some compositions. The results obtained are as follows:

TABLE 3

| Hardener | % by weight of vehicle | % swell DK–50 | fix | wash |
|---|---|---|---|---|
| Control | — | 1400 | 600 | 700 |
| Resorcinol diglycidyl ether | 5 | 490 | 170 | 170 |
| Example 3 | 5 | 690 | 190 | 190 |
| Control | — | 2300 | 850 | 960 |
| Example 2 | 5 | 940 | 270 | 290 |

The above procedure is repeated using a copolymer consisting of 90 percent butyl acrylate by weight and 10 percent acrylic acid by weight in place of the 80/20 ethyl acrylate-acrylic acid copolymer. The swelling characteristics are given in the following table:

TABLE 4

| Hardener | % by weight of vehicle | % swell DK–50 | fix | wash |
|---|---|---|---|---|
| Control | — | 270 | 130 | 140 |
| Resorcinol diglycidyl ether | 5 | 250 | 190 | 180 |
| Example 3 | 5 | 190 | 83 | 83 |
| Control | — | 250 | 150 | 150 |
| Example 2 | 6 | 190 | 100 | 100 |

Similarly good results are obtained using the hardeners of examples 4, 5, and 6 in similar ranges (percent by weight) as in the above procedure.

EXAMPLE 10

Samples of gelatin contained in a photographic silver halide emulsion are coated onto a suitable support. To each sample is added various concentrations of the hardeners of example 4, 5, and 6. The samples are tested for hardness after 3 days incubation at 120°F. and 50 percent relative humidity by immersing in water at 25°C. for 3 minutes. The percent of the swell of the emulsion is calculated and compared to control samples containing no hardener and a known hardener, mucochloric acid at its optimum hardening concentration.

TABLE 5

| Hardener | % by weight of gelatin | % swell |
|---|---|---|
| None | — | 630 |
| Mucochloric acid | 0.5 | 420 |
| Example 4 | 3 | 380 |
| None | — | 600 |
| Mucochloric acid | 0.5 | 350 |
| Example 5 | 1 | 310 |
| Example 5 | 3 | 310 |
| None | — | 700 |
| Mucochloric acid | 0.5 | 460 |
| Example 6 | 3 | 480 |

EXAMPLE 11

As already indicated, the hardeners employed in accordance with our invention are particularly useful in photographic emulsions in which color couplers have been incorporated. In contrast to some prior art hardeners, it has been found that the hardeners described herein result in reduced stain with no significant adverse photographic effects. Also no adverse effect upon dye hue or stability of the emulsion has been noted. To illustrate, two separate elements are prepared having the following layer arrangement. The use of the hardener is varied between the two elements as described hereinafter.

Layer 6—Gelatin layer.

Layer 5—Red-sensitive silver chlorobromide gelatin consisting of 90 mole percent bromide + a phenolic cyan coupler of the type described in U.S. Pat. No. 2,423,730.

Layer 4—Gelatin layer + an ultraviolet absorber.

Layer 3—Green-sensitive silver chlorobromide gelatin emulsion consisting of 80 mole percent chloride + a pyrazolone magenta coupler of the type described in U.S. Pat. No. 2,600,788.

Layer 2—Gelatin layer.

Layer 1—Blue-sensitive silver chlorobromide gelatin emulsion consisting of 98 mole percent bromide + an acyl acetanilide yellow coupler of the type described in U.S. Pat. No. 2,875,057.

In one element mucochloric acid is the hardener used in all six layers in concentration of 0.54 percent by weight of gelatin and in the other element all six layers contain 1 percent by weight of the hardener of example 3. The above layers are coated on paper support in the order given, layer 1 being immediately adjacent to the paper. Exposure of the two samples and processing by a color development process used in making color prints indicates the improvement in stain in the case of hardeners in accordance with the invention as compared to an aldehyde-type hardener as represented by mucochloric acid. The improvement in stain is shown by the increase in percent of reflectance, measured by a recording spectrophotometer and compared with the sample in which the aldehyde-type hardener has been used.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A bis isoxazole or a bis isoxazole quaternary salt, each comprising two isoxazole rings linked through ring positions 2, 4 or 5 and having one of the formulas:

(I)
(II)
or
(III)

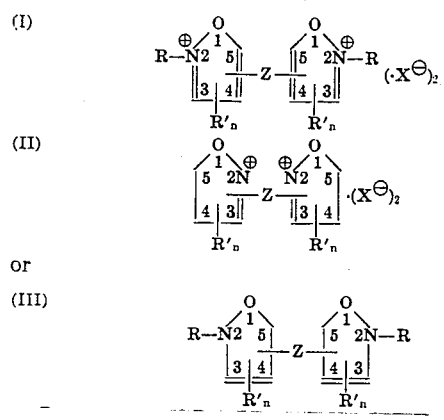

where each Z is divalent aliphatic or aromatic hydrocarbon of not more than 10 carbon atoms, each R is aliphatic hydrocarbon of one to four carbon atoms, each R' is alkyl of one to six carbon atoms, cycloalkyl of five to six carbon atoms or phenyl, each $n$ is an integer of from 0 to 2 and each X is an anion, provided R' is not linked to an isoxazole ring in the 3 position.

2. 5,5'-Phenylenebisisoxazole.
3. 5,5'-Tetramethylenebis(isoxazole).
4. 4,4'-p-Phenylenebis(isoxazole).

* * * * *

UNITED STATES PATENT OFFICE
CERTIFICATE OF CORRECTION

Patent No. 3,681,372          Dated  August 1, 1972

Inventor(s) Donald M. Burness and Jerome J. Looker

It is certified that error appears in the above-identified patent and that said Letters Patent are hereby corrected as shown below:

Column 5, line 2, "ethanoldchloroform" should read ---ethanolchloroform---;

Column 9, lines 5-10 (Formula II)

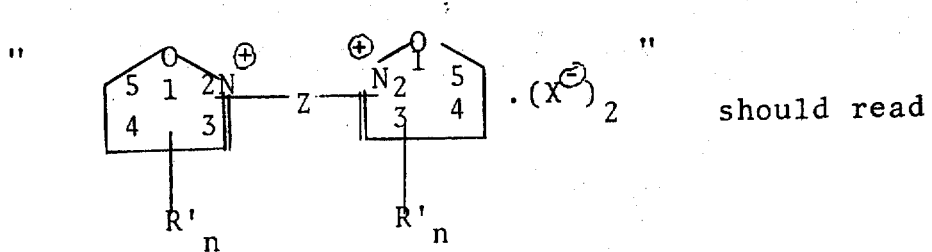    should read

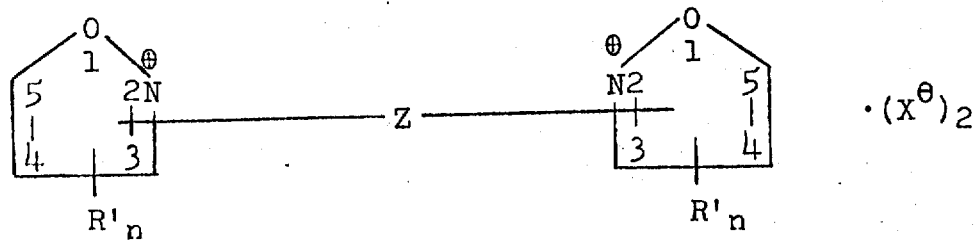

Signed and sealed this 8th day of May 1973.

(SEAL)
Attest:

EDWARD M. FLETCHER, JR.
Attesting Officer

ROBERT GOTTSCHALK
Commissioner of Patents